US012611702B2

(12) United States Patent
Yager et al.

(10) Patent No.: US 12,611,702 B2
(45) Date of Patent: Apr. 28, 2026

(54) APPARATUS FOR RIGHTING ANIMAL CAGES FROM A WASHING DEVICE

(71) Applicant: Visron Design, Inc., Rochester, NY (US)

(72) Inventors: Benjamin I. Yager, Williamson, NY (US); Jeffrey C. Robertson, Rochester, NY (US)

(73) Assignee: VISRON DESIGN, INC., Rochester, NY (US)

( * ) Notice: Subject to any disclaimer, the term of this patent is extended or adjusted under 35 U.S.C. 154(b) by 56 days.

(21) Appl. No.: 18/830,838

(22) Filed: Sep. 11, 2024

(65) Prior Publication Data

US 2026/0070099 A1 Mar. 12, 2026

(51) Int. Cl.
*B08B 9/08* (2006.01)
*B08B 9/20* (2006.01)
*B08B 9/24* (2006.01)
*B08B 9/26* (2006.01)

(52) U.S. Cl.
CPC .......... *B08B 9/0826* (2013.01); *B08B 9/0861* (2013.01); *B08B 9/205* (2013.01)

(58) Field of Classification Search
CPC ...... B08B 9/0826; B08B 9/0861; B08B 9/205
See application file for complete search history.

(56) References Cited

U.S. PATENT DOCUMENTS 3,277,907 A * 10/1966 Goldman .................. B08B 3/02 134/155
5,771,840 A * 6/1998 Pelletier ................ B08B 9/0861 119/458
6,394,033 B1 * 5/2002 Trogstam ............... A01K 1/031 119/419
6,553,939 B1 * 4/2003 Austin ................... A01K 1/031 119/455
7,114,462 B2 * 10/2006 Austin .................... B08B 3/022 119/458
7,621,285 B2 11/2009 Robert et al.
8,002,104 B2 8/2011 Lim et al.
8,936,176 B2 1/2015 Roe
9,004,084 B2 4/2015 Lim et al.
2007/0056612 A1 * 3/2007 Robert .................. F26B 21/004 134/72
2008/0105515 A1 * 5/2008 Damick ................. A01K 1/031 901/31
2010/0024240 A1 * 2/2010 Robert .................. B08B 9/0861 34/218

(Continued)

FOREIGN PATENT DOCUMENTS

EP 3693093 A1 * 8/2020 ............. A01K 1/031
FR 2881318 * 8/2006

(Continued)

*Primary Examiner* — Alexander Markoff
(74) *Attorney, Agent, or Firm* — Michael J. Nickerson

(57) ABSTRACT

A cage orienting apparatus for use in an object cleaning and filling system includes a first conveyor device; a second conveyor device; and a rotating mechanism, operatively connected to the first conveyor device and the second conveyor device, configured to rotate the first conveyor device and the second conveyor device 180°. The first conveyor device and the second conveyor device being positioned such that the first conveyor device and the second conveyor device are substantially parallel.

22 Claims, 13 Drawing Sheets

(56) References Cited

U.S. PATENT DOCUMENTS

| | | | | |
|---|---|---|---|---|
| 2010/0024849 A1* | 2/2010 | Robert | F26B 21/004 | 134/61 |
| 2011/0038700 A1* | 2/2011 | Lim | B65G 47/252 | 414/769 |
| 2013/0092187 A1* | 4/2013 | Lim | B08B 3/00 | 134/8 |
| 2014/0338610 A1* | 11/2014 | Zanotti | A01K 45/005 | 119/453 |
| 2015/0209844 A1* | 7/2015 | Zanotti | B08B 9/32 | 134/152 |
| 2015/0209845 A1* | 7/2015 | Zanotti | A01K 45/005 | 134/152 |
| 2017/0339915 A1* | 11/2017 | Borghi | B08B 3/024 | |
| 2018/0229280 A1* | 8/2018 | Reed | B08B 9/34 | |
| 2022/0314285 A1* | 10/2022 | Conelli | B08B 3/024 | |
| 2022/0371061 A1* | 11/2022 | Borghi | B08B 9/093 | |
| 2023/0227270 A1* | 7/2023 | Andreasi | B65G 41/002 | 198/403 |
| 2023/0256484 A1* | 8/2023 | Borghi | B08B 13/00 | 134/18 |

FOREIGN PATENT DOCUMENTS

| | | | |
|---|---|---|---|
| WO | WO-2007002615 A2 * | 1/2007 | B65G 60/00 |
| WO | WO-2016193943 A1 * | 12/2016 | A61L 2/24 |

* cited by examiner

APPARATUS FOR RIGHTING ANIMAL CAGES FROM A WASHING DEVICE

BACKGROUND

Medical and animal research facilities typically maintain large populations of laboratory animals, such as mice, rats, guinea pigs, etc. A typical animal cage includes a bottom portion having bedding material placed therein. A removable top portion or cover fits over the bottom portion. The cover may include a filter and vents which cooperate to provide an isolated environment with low humidity and low ammonia build-up within the cage.

Maintaining a sanitary work environment for employees and a clean living environment for the animals requires that the animal cages be cleaned on a regular basis. More specifically, each animal cage must be washed, disinfected, and re-filled with fresh bedding material. It should be appreciated that, at large facilities, a substantial effort is required to regularly maintain many animal cages.

Devices for washing animal cages are known. Typically, animal cage washing devices include one or more stations such as a pre-wash station, a wash station, a rinse station, a disinfecting station and a drying station. The stations are commonly linked together by a motorized conveyor belt which continuously transports the cage portions through each of the stations. The soiled bedding material within the lower cage portion is typically disposed of prior to being placed upside down (open side down orientation) on the conveyor belt at the entrance of the washing device. Once the soiled lower cage portion has been transported through each of the stations forming the washing device, a clean, disinfected and dry lower cage portion emerges from the end of the conveyor belt.

Devices for automatically filling animal cages with a metered amount of clean bedding material are also known. Typical bedding filler devices include a conveyor belt which transports an upright lower cage portion through a filling station having a metering device which dispenses a predetermined amount of fresh bedding material from a hopper into the cage lower portion. A properly filled cage lower portion emerges from the filling station ready for research animals to be placed therein.

A bedding filler device is usually located next to a washing device. As the lower cage portions emerge from the washing device, a worker, typically interposed between the washing device and the bedding filler device, removes the lower cage portions from the conveyor belt, turns the lower cage portions upright, and then places the upright lower cage portions on the conveyor belt associated with the bedding filler device.

It is appreciated that dedicating employee resources to the task of turning over and positioning clean lower cage portions on a conveyor belt associated with a bedding filler device is not an efficient use of such resources. This is especially true when employees are already necessary for loading the soiled animal cages into the washing device and for receiving the filled lower cage portions that have passed through the filling station of the bedding filler device.

Thus, a prior art apparatus has been developed to automatically flip the cleaned cages over to a position that allows the cages to receive the new bedding without human intervention.

FIG. 1 illustrates a prior art system which automatically flips cleaned cages over to a position that allows the cleaned cages to receive the new bedding without human intervention. As illustrated in FIG. 1, an animal cage washing device 10 has a number of processing stations such as a pre-wash station, a wash station, a rinse station, and a dryer station 18.

A motorized conveyor belt 20 extends continuously from an entrance of the cage washer 10 through each of the stations to exit 24 of the cage washer 10. The conveyor belt 20 transports items and equipment such as trays or lower cage portions 26 from the entrance through each of the stations to exit 24. The lower cage portions 26 may include flanges 28 extending peripherally around the open end edges of the side walls that define the lower cage portions 26.

In order for the cage lower portions 26 to properly drain and dry after being washed, the cage lower portions 26 are placed upside down (i.e. an open side down orientation) on the conveyor belt 20. A bedding dispenser device 30 is positioned proximate exit 24 of the cage washer 10. The cage washer 10 and the bedding dispenser 30 cooperate to form an animal cage washing system.

The bedding dispenser 30 has a filling station including a hopper for receiving bulk bedding material. The filling station also includes a metering unit which regulates the amount of bedding material discharged into the cage lower portions 26 that pass below the metering unit.

A conveyor belt 40 driven by a drive 42, such as a motor, extends from an entrance of the bedding dispenser 30 through the filling station to an exit of the bedding dispenser 30. An output of the drive 42 is mechanically coupled, linked, or otherwise connected to a conveyor belt 48 via mechanical linkage 118 such as a drive belt, transmission, gears, or the like.

The cage lower portions 26 are transported by the conveyor belt 20 from the washer exit to a cage support member 92 of a cage righting device 90. The inclined upper surface 94 of the support member 92 permits a leading edge, or more particularly, the flange 28 of a cage lower portion 26 to slide into contact with flip wheel 64.

As the flip wheel 64 rotates in a counter-clockwise direction as shown by the arrow 120. As the flip wheel 64 continues to rotate, the lower cage portion 26 pivots in a clockwise direction about an intermediate edge of the upper surface.

The momentum of the pivoting lower cage portion 26 causes the lower cage portion 26 to flip over the flip wheel 64 and land upright on the rotating conveyor belt 40 of the bedding dispenser 30.

The conveyor belt 40 then transports the upright lower cage portion 26 through the filling station where a predetermined amount of bedding material is dispensed into the lower cage portion by the metering unit. The conveyor belt 40 then transports the clean and filled lower cage portion 26 to the exit of the bedding dispenser 30.

Other examples of prior art apparatus and systems that automatically flip the cleaned cages over to a position that allows the cages to receive the new bedding without human intervention are disclosed in U.S. Pat. Nos. 5,771,840; 6,394,033; 7,114,462; 7,621,285; 8,002,104; 8,936,176; and 9,004,084. The entire contents of U.S. Pat. Nos. 5,771,840; 6,394,033; 7,114,462; 7,621,285; 8,002,104; 8,936,176; and 9,004,084 are hereby incorporated by reference.

A problem with the prior art flipping devices is that the listed prior art flipping devices cannot work with triangle shaped cages without requiring the adding of mechanisms to specifically handle triangle shaped cages.

Moreover, the prior art flipping devices do not properly operate when cages exit the washer in an orientation such that the front faces of the cages are not substantially parallel or at an oblique angle to the exit of the washer. In other words, as illustrated in FIG. 2, the front faces 261 of the exiting cages 26 exiting the exit 181 of the washer 18; i.e., the faces of the exiting cages do not align with the face of the exit of the washer.

Additionally, the prior art flipping devices do not allow trays to pass through the flipping device uninterrupted.

Thus, it is desirable to provide a flipping device or apparatus that is configured to work with triangle shaped cages.

Moreover, it is desirable to provide a flipping device or apparatus that is configured to properly operate when cages exit the washer in a sideways orientation.

Furthermore, it is desirable to provide a flipping device or apparatus that is configured to allow the passing of trays through the flipping device uninterrupted.

Additionally, it is desirable to provide a flipping device or apparatus that is configured to properly operate when cages exit the washer in an upside down orientation (in an open side down orientation).

BRIEF DESCRIPTION OF THE DRAWINGS

The drawings are only for purposes of illustrating various embodiments and are not to be construed as limiting, wherein.

DETAILED DESCRIPTION OF THE DRAWINGS

For a general understanding, reference is made to the drawings. It is noted that the drawings may not have been drawn to scale and that certain regions may have been purposely drawn disproportionately so that the features and concepts may be properly illustrated.

Figure 1:
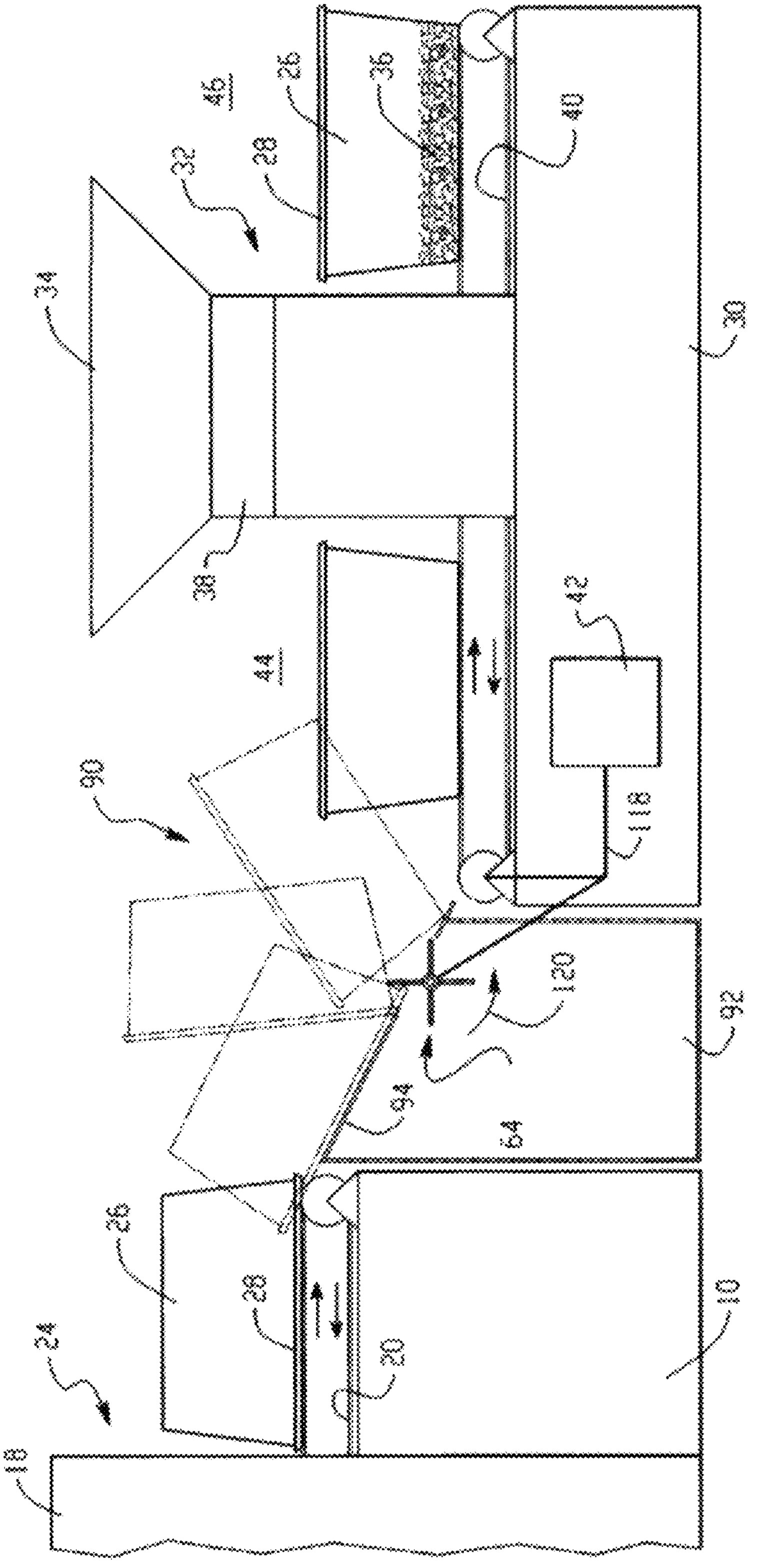
FIGURE 1 (PRIOR ART)
FIG. 1 illustrates a prior art system which automatically flips cages.
Figure 2:
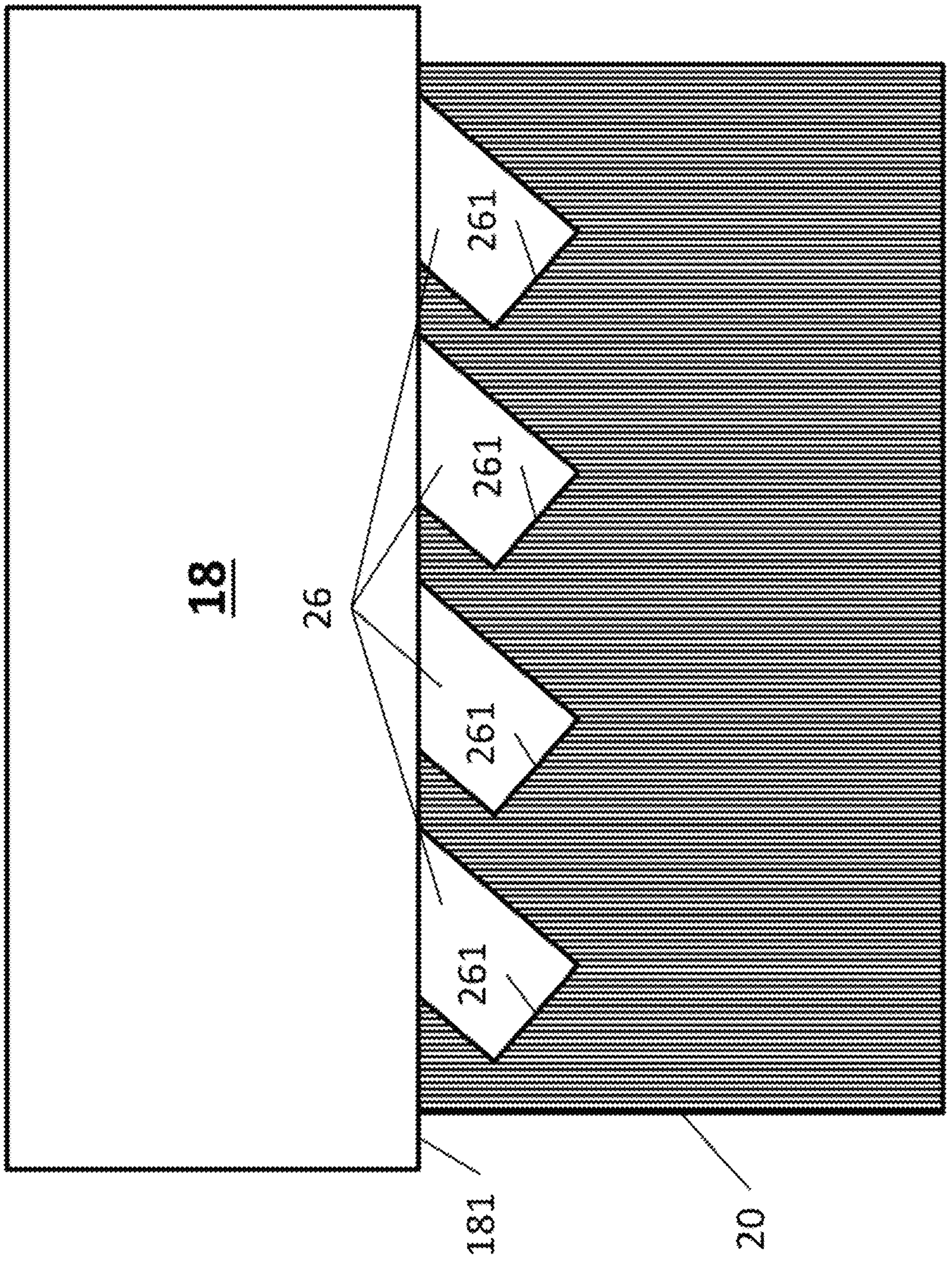
FIGURE 2 (PRIOR ART)
FIG. 2 illustrates an orientation of the cages exiting a prior art washer.
Figure 3:
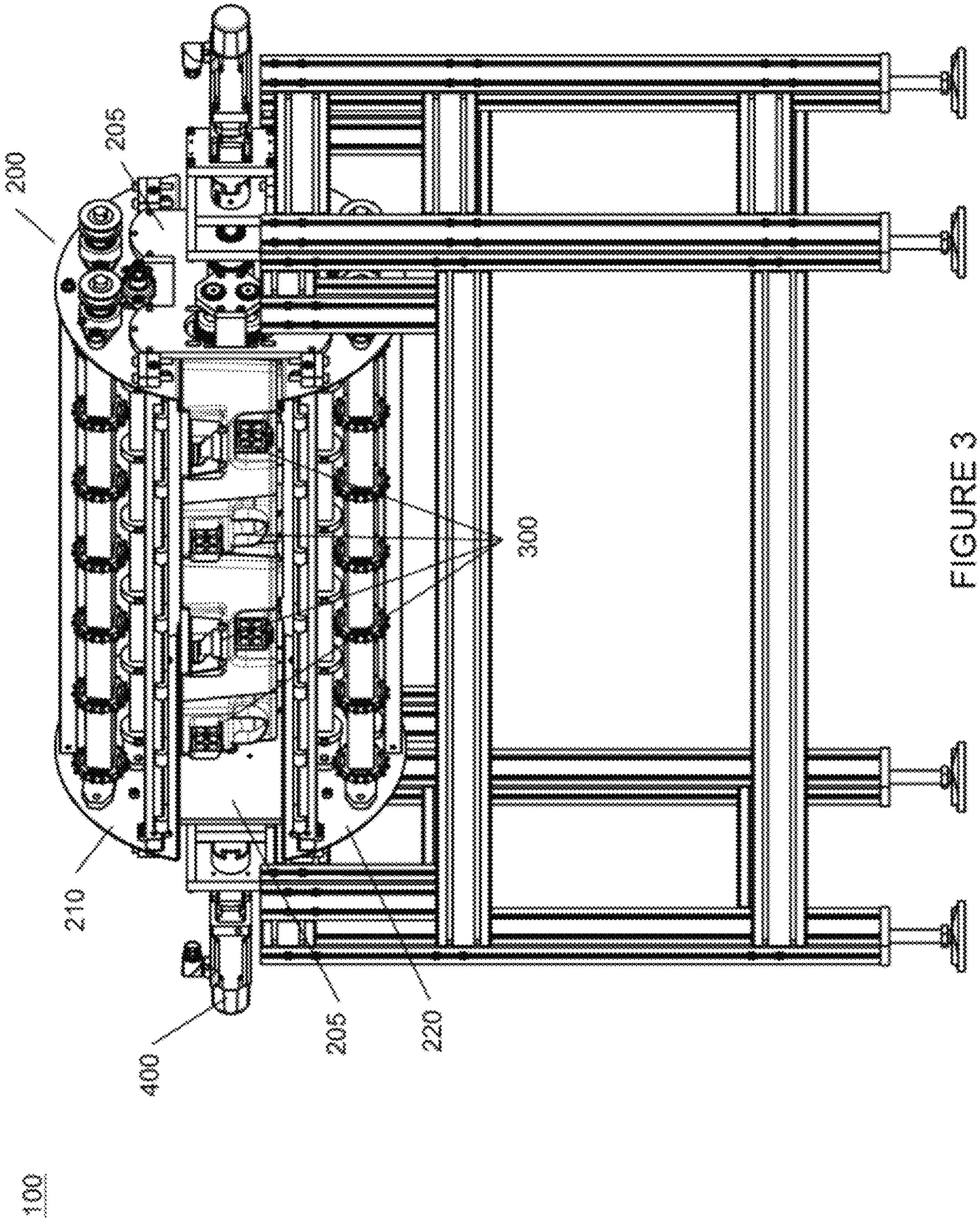
FIG. 3 illustrates an apparatus for automatically flipping cages.

FIG. 3 illustrates an apparatus for automatically flipping cages. As illustrated in FIG. 3, an apparatus for automatically flipping cages 100 includes a flippable (rotatable) conveyor system 200 configured to convey cages from one station to another station. In a preferred embodiment, the flippable (rotatable) conveyor system 200 is configured to convey cleaned cages from a washing station to a bedding station.

The flippable (rotatable) conveyor system 200 includes a first conveyor belt system 210, which includes a bi-directionality driven first conveyor belt (conveying mechanism) driven by a motor (not shown), and a second conveyor belt system 220, which includes a bi-directionality driven second conveyor belt (conveying mechanism) driven by a motor (not shown).

Figure 6:
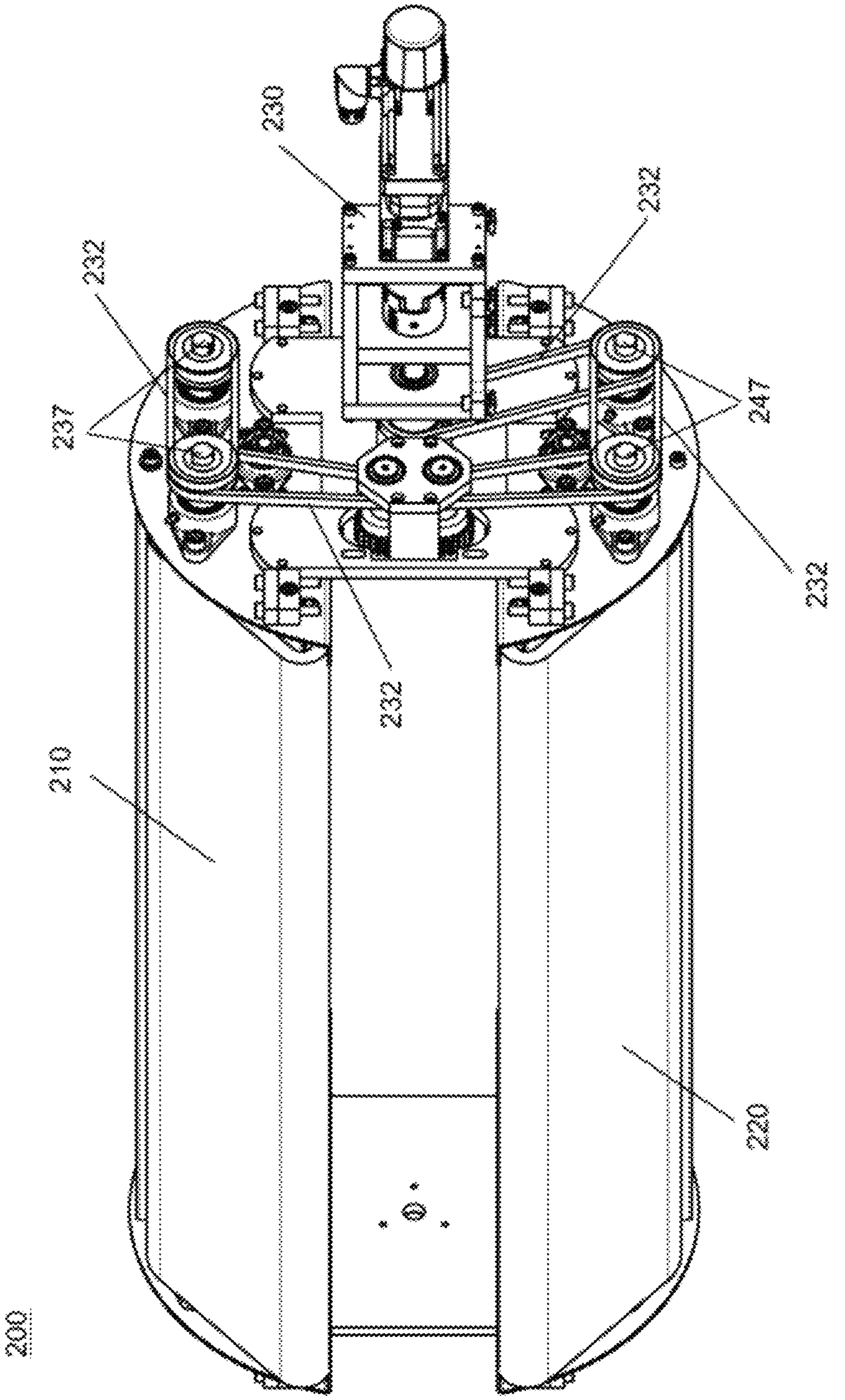
FIG. 6 illustrates a mechanism enabling a motor to drive both conveyer belts (conveying mechanisms) of the apparatus for automatically flipping cages.

It is noted that the bi-directionality driven first conveyor belt (conveying mechanism) and the bi-directionality driven second conveyor belt (conveying mechanism) may be driven by the same motor as illustrated in FIG. 6, or alternatively, the bi-directionality driven first conveyor belt (conveying mechanism) and the bi-directionality driven second conveyor belt (conveying mechanism) may be driven by separate motors. Notwithstanding, the motor(s) is (are) controlled by a controller (not shown).

It is noted that motorized rollers can alternatively be used instead of the conveyor belts (conveying mechanisms).

The first conveyor belt system 210 and second conveyor belt system 220 are connected together by connection members 205 such that the first conveyor belt system 210 is orientated substantially parallel to the second conveyor belt system 220.

It is noted that the first conveyor belt system 210 and the second conveyor belt system 220 are biased or spring loaded (not shown) such that the first conveyor belt system 210 and second conveyor belt system 220 both physically engage cages 300, the first conveyor belt system 210 engaging the top of the cages 300 and the second conveyor belt system 220 engaging the top of the cages 300.

The biased or spring loaded functionality allows the apparatus for automatically flipping cages 100 to securely maintain the cages 300 in place during the flipping action.

Moreover, the biased or spring loaded functionality biases the first conveyor belt system 210 towards the second conveyor belt system 220. Alternatively, the biased or spring loaded functionality biases the second conveyor belt system 220 towards the first conveyor belt system 210. Alternatively, the biased or spring loaded functionality biases the second conveyor belt system 220 and the first conveyor belt system 210 towards each other.

It is noted that the biased or spring loaded functionality may be realized by springs, air cylinders, or other mechanisms to maintain a directional bias of the second conveyor belt system 220 and the first conveyor belt system 210 towards each other.

The apparatus for automatically flipping cages 100 also includes a flipping mechanism (motor) 400 for bi-directionally flipping the flippable (rotatable) conveyor system 200. The flippable (rotatable) conveyor system 200 is flipped 180°. The flipping mechanism (motor) 400 is controlled by a controller (not shown).

In operations, the apparatus for automatically flipping cages 100 receives cleaned cages 300 from a conventional washing station (not shown) with the cleaned cages 300 being in an upside down orientation (i.e. an open side down orientation) on the second conveyor belt system 220. The cleaned cages 300 are physically engaged with both the first conveyor belt system 210 and the second conveyor belt system 220 due to the biased or spring loaded functionality.

It is noted that the biased or spring loaded functionality may be realized by springs, air cylinders, or other mechanisms to maintain a directional bias of the second conveyor belt system 220 and the first conveyor belt system 210 towards each other.

The first conveyor belt system 210 and the second conveyor belt system 220 drive the respective conveyor belts (conveying mechanisms) in tandem to bring the cleaned cages 300 into the apparatus for automatically flipping cages 100. Once the cleaned cages 300 are in the apparatus for automatically flipping cages 100, the flipping mechanism (motor) 400 flips the flippable (rotatable) conveyor system 200 180°. The flipping action can be in either direction.

Once flipped, the first conveyor belt system 210 and the second conveyor belt system 220 drive the respective conveyor belts (conveying mechanisms) in tandem to exit the flipped cleaned cages 300 into a bedding apparatus (not shown).

It is noted that the flipping mechanism (motor) 400 does not need to flip the flippable (rotatable) conveyor system 200 back to its original state because the flippable (rotatable) conveyor system 200 is ready to receive the next set of cleaned cages 300 (in an upside down orientation (i.e. an open side down orientation) on the first conveyor belt system 210) without further flipping.

Figure 4:
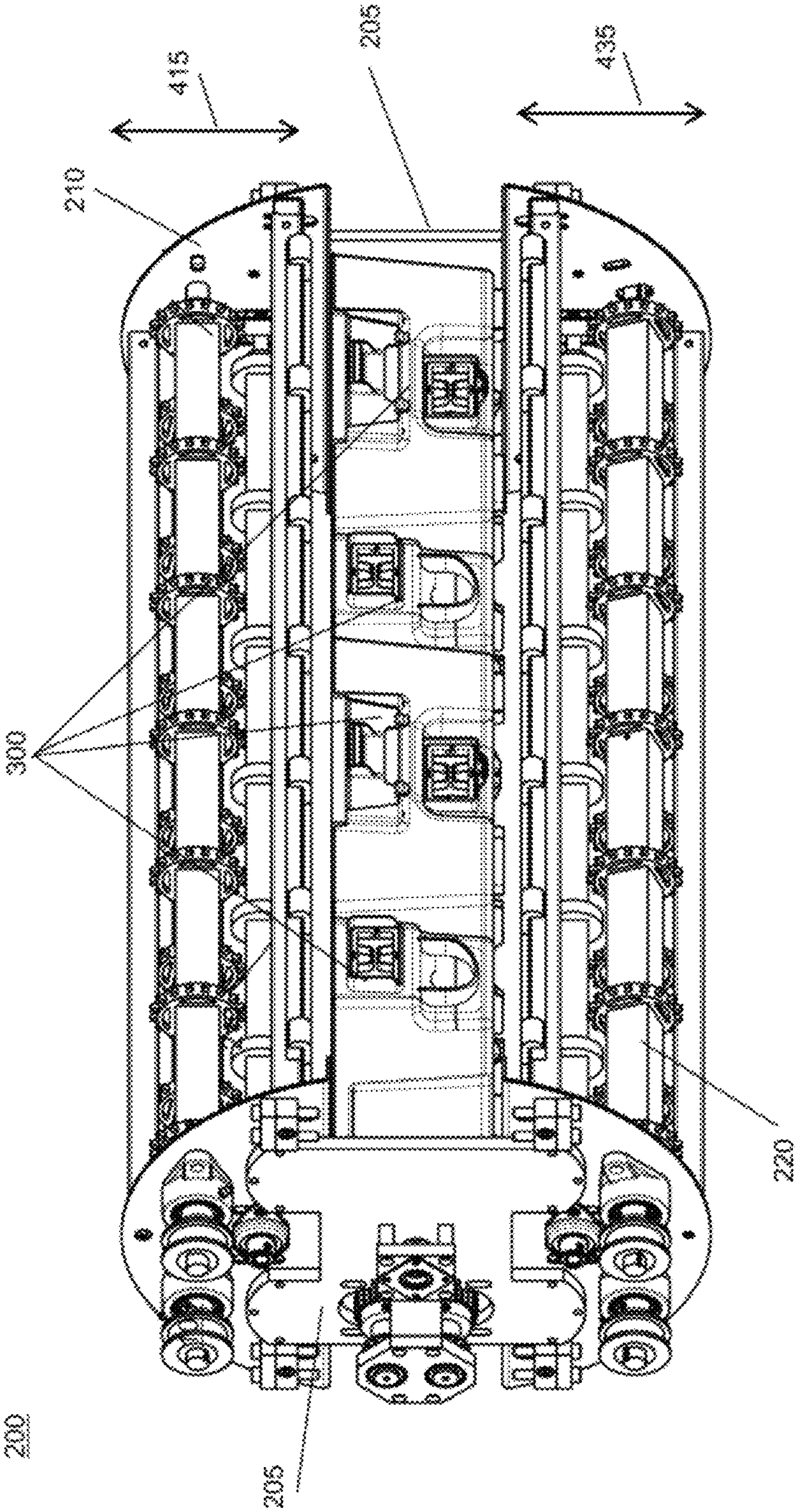
FIG. 4 illustrates the apparatus of FIG. 3 in a first orientation.

FIG. 4 illustrates the apparatus of FIG. 4 in a first orientation. As illustrated in FIG. 4, the flippable (rotatable) conveyor system 200 includes a first conveyor belt system 210, which includes a bi-directionality driven first conveyor belt (conveying mechanism) driven by a motor (not shown), and a second conveyor belt system 220, which includes a bi-directionality driven a second conveyor belt (conveying mechanism) driven by a motor (not shown).

The first and second motors are controlled by a controller (not shown). In this orientation, the first conveyor belt system 210 is located above the second conveyor belt system 220.

The first conveyor belt system 210 and second conveyor belt system 220 are connected together by connection members 205 such that the first conveyor belt system 210 is orientated substantially parallel to the second conveyor belt system 220.

It is noted that the first conveyor belt system 210 and the second conveyor belt system 220 are biased or spring loaded (not shown) such that the first conveyor belt system 210 and second conveyor belt system 220 both physically engage cages 300. In this orientation, the first conveyor belt system 210 engages the top of the cages 300, and the second conveyor belt system 220 engages the top of the cages 300. The biased or spring loaded functionality allows the apparatus for automatically flipping cages (not shown) to securely maintain the cages 300 in place during the flipping action.

The biased or spring loaded functionality allows the first conveyor belt system 210 a range of movement as shown by arrow 415. The biased or spring loaded functionality also allows the second conveyor belt system 220 a range of movement as shown by arrow 435.

Moreover, the biased or spring loaded functionality biases the first conveyor belt system 210 towards the second conveyor belt system 220. Alternatively, the biased or spring loaded functionality biases the second conveyor belt system 220 towards the first conveyor belt system 210. Alternatively, the biased or spring loaded functionality biases the second conveyor belt system 220 and the first conveyor belt system 210 towards each other.

It is noted that the biased or spring loaded functionality may be realized by springs, air cylinders, or other mechanisms to maintain a directional bias of the second conveyor belt system 220 and the first conveyor belt system 210 towards each other.

Figure 5:
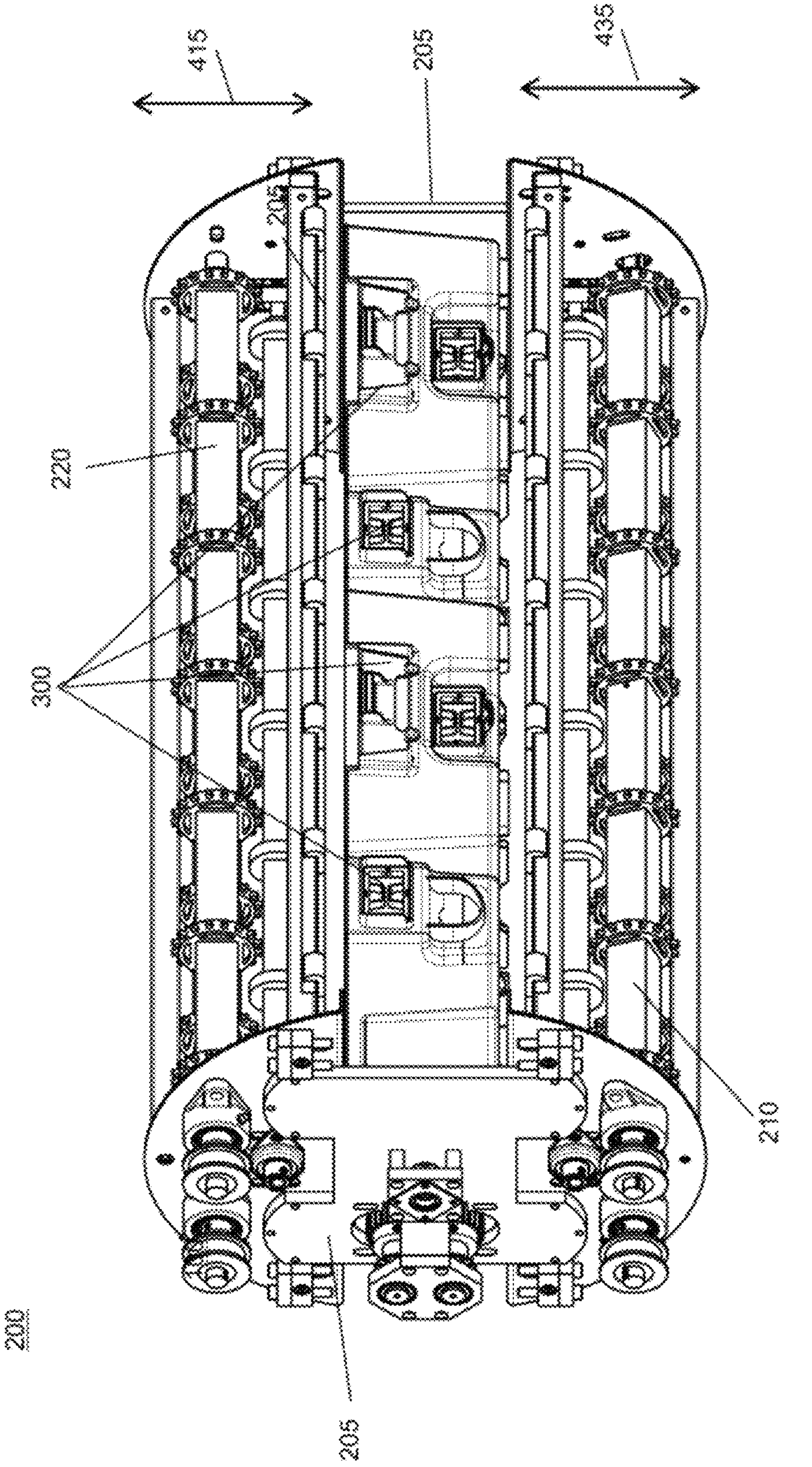
FIG. 5 illustrates the apparatus of FIG. 4 in a second orientation.

FIG. 5 illustrates the apparatus of FIG. 5 in a second orientation. As illustrated in FIG. 5, the flippable (rotatable) conveyor system 200 includes a first conveyor belt system 210, which includes a bi-directionality driven first conveyor belt (conveying mechanism) driven by a motor (not shown), and a second conveyor belt system 220, which includes a bi-directionality driven a second conveyor belt (conveying mechanism) driven by a motor (not shown).

It is noted that the bi-directionality driven first conveyor belt (conveying mechanism) and the bi-directionality driven second conveyor belt (conveying mechanism) may be driven by the same motor as illustrated in FIG. 6, or alternatively, the bi-directionality driven first conveyor belt (conveying mechanism) and the bi-directionality driven second conveyor belt (conveying mechanism) may be driven by separate motors. Notwithstanding, the motor(s) is (are) controlled by a controller (not shown).

In the second orientation, the first conveyor belt system 210 is located below the second conveyor belt system 220.

It is noted that motorized rollers can alternatively be used instead of the conveyor belts (conveying mechanisms).

The first conveyor belt system 210 and second conveyor belt system 220 are connected by connection members 205 such that the first conveyor belt system 210 is orientated substantially parallel to the second conveyor belt system 220.

It is noted that the first conveyor belt system 210 and the second conveyor belt system 220 are biased or spring loaded (not shown) such that the first conveyor belt system 210 and second conveyor belt system 220 both physically engage cages 300.

In second orientation (the flippable (rotatable) conveyor system 200 has been flipped from the first orientation, with cages 300 therein), the first conveyor belt system 210 engages the top of the cages 300, and the second conveyor belt system 220 engages the top of the cages 300.

Alternatively, in the second orientation, if the flippable (rotatable) conveyor system 200 has been cleared out of the cages 300, the first conveyor belt system 210 would be ready to engage the tops of a new set of the cages 300, and the second conveyor belt system 220 would be ready to engage the bottoms of a new set of the cages 300.

The biased or spring loaded functionality allows the apparatus for automatically flipping cages (not shown) to securely maintain the cages 300 in place during the flipping action.

The biased or spring loaded functionality allows the first conveyor belt system 210 a range of movement as shown by arrow 415. The biased or spring loaded functionality also allows the second conveyor belt system 220 a range of movement as shown by arrow 435.

Moreover, the biased or spring loaded functionality biases the first conveyor belt system 210 towards the second conveyor belt system 220. Alternatively, the biased or spring loaded functionality biases the second conveyor belt system 220 towards the first conveyor belt system 210. Alternatively, the biased or spring loaded functionality biases the second conveyor belt system 220 and the first conveyor belt system 210 towards each other.

It is noted that the biased or spring loaded functionality may be realized by springs, air cylinders, or other mechanisms to maintain a directional bias of the second conveyor belt system 220 and the first conveyor belt system 210 towards each other.

FIG. 6 illustrates a mechanism enabling a motor to drive both conveyer belts (conveying mechanisms) of the apparatus for automatically flipping cages. As illustrated in FIG. 6, a flippable (rotatable) conveyor system 200 includes a first bi-directionality driven conveyor belt system 210, which is driven by drive shafts 237 and a motor 230, and a second bi-directionality driven conveyor belt system 220, which is driven by drive shafts 247. One end of the drive shafts 237 is mechanically linked, via a linkage mechanism including belts or chains 232 and rollers, to the drive shafts 247 such that the rotation of the drive shafts 237, through the linkage mechanism, causes the drive shafts 237 to rotate.

It is noted that the bi-directionality driven first conveyor belt system and the bi-directionality driven second conveyor belt system may be driven by the same motor, or alternatively, the bi-directionality driven first conveyor belt system and the bi-directionality driven second conveyor belt system may be driven by separate motors. Notwithstanding, the motor(s) is (are) controlled by a controller.

Figure 7:
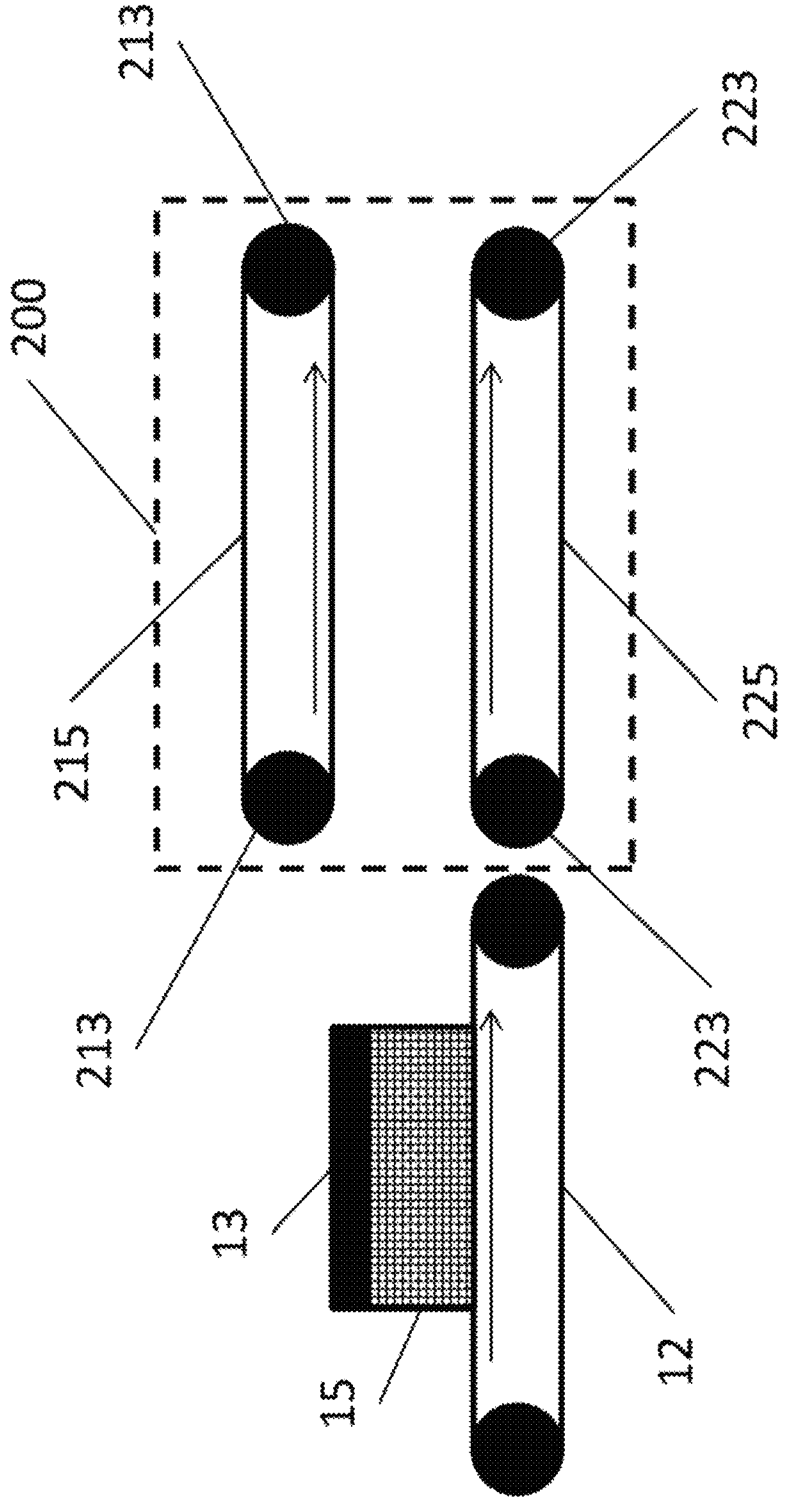
FIG. 7 illustrates a block diagram of an emptied apparatus for automatically flipping cages.

FIG. 7 illustrates a block diagram of an emptied apparatus for automatically flipping cages. As illustrated in FIG. 7, a conveyor belt 12 is configured to move a cage 15, having a bottom 13, to flippable (rotatable) conveyor system 200. For example, conveyor belt 12 is configured to move a cage 15, having a bottom 13, from a washing station (not shown) to flippable (rotatable) conveyor system 200.

The flippable (rotatable) conveyor system 200 includes a first bi-directionality driven conveyor belt (conveying mechanism) 215, which is driven by a first set of rollers 213 and a motor (not shown), and a second bi-directionality driven conveyor belt (conveying mechanism) 225, which is driven by a second set of rollers 223 and a motor (not shown).

It is noted that the bi-directionality driven first conveyor belt (conveying mechanism) and the bi-directionality driven second conveyor belt (conveying mechanism) may be driven by the same motor, or alternatively, the bi-directionality driven first conveyor belt (conveying mechanism) and the bi-directionality driven second conveyor belt (conveying mechanism) may be driven by separate motors. Notwithstanding, the motor(s) is (are) controlled by a controller (not shown).

As noted above, the first conveyor belt (conveying mechanism) 215 and the second conveyor belt (conveying mechanism) 225 are biased or spring loaded (not shown) such that the first conveyor belt (conveying mechanism) 215 and second conveyor belt (conveying mechanism) 225 both physically engage cage 15.

Figure 8:
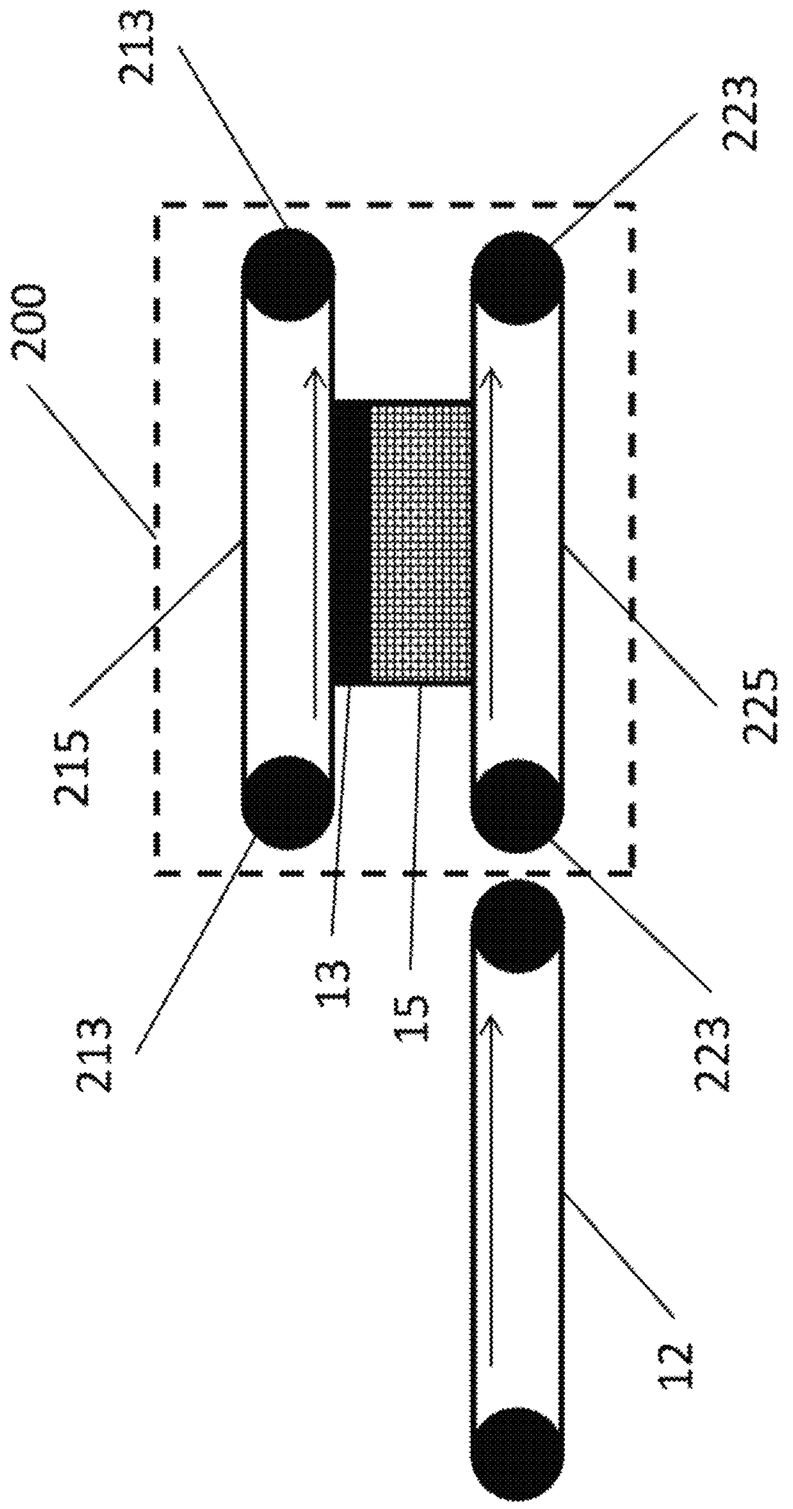
FIG. 8 illustrates a block diagram of the apparatus of FIG. 7, in a first orientation, having a cage therein.

Upon engaging the cages 15, the first conveyor belt (conveying mechanism) 215 and the second conveyor belt (conveying mechanism) 225 convey the cage 15 into the flippable (rotatable) conveyor system 200, as illustrated in FIG. 8.

The flippable (rotatable) conveyor system 200, as described above, is configured to be flipped by a flipping mechanism (motor) (not shown).

FIG. 8 illustrates a block diagram of the apparatus of FIG. 7, in a first orientation, having a cage therein. As illustrated in FIG. 8, a conveyor belt 12 is configured to move a cage 15, having a bottom 13, to flippable (rotatable) conveyor system 200. For example, conveyor belt 12 is configured to move a cage 15, having a bottom 13, from a washing station (not shown) to flippable (rotatable) conveyor system 200.

The flippable (rotatable) conveyor system 200 includes a first bi-directionality driven conveyor belt (conveying mechanism) 215, which is driven by a first set of rollers 213 and a motor (not shown), and a second bi-directionality driven conveyor belt (conveying mechanism) 225, which is driven by a second set of rollers 223 and a motor (not shown).

The first conveyor belt (conveying mechanism) 215 and the second conveyor belt (conveying mechanism) 225 work in tandem to convey the cage 15 into the flippable (rotatable) conveyor system 200.

As noted above, the first conveyor belt (conveying mechanism) 215 and the second conveyor belt (conveying mechanism) 225 are biased or spring loaded (not shown) such that the first conveyor belt (conveying mechanism) 215 and second conveyor belt (conveying mechanism) 225 both physically engage cage 15.

It is noted that the biased or spring loaded functionality may be realized by springs, air cylinders, or other mechanisms to maintain a directional bias of the second conveyor belt (conveying mechanism) 225 and the first conveyor belt (conveying mechanism) 215 towards each other.

As illustrated in FIG. 8, the first conveyor belt 215 engages the bottom 13 of cage 15, and the second conveyor belt 225 engages the top of cage 15.

Figure 9:
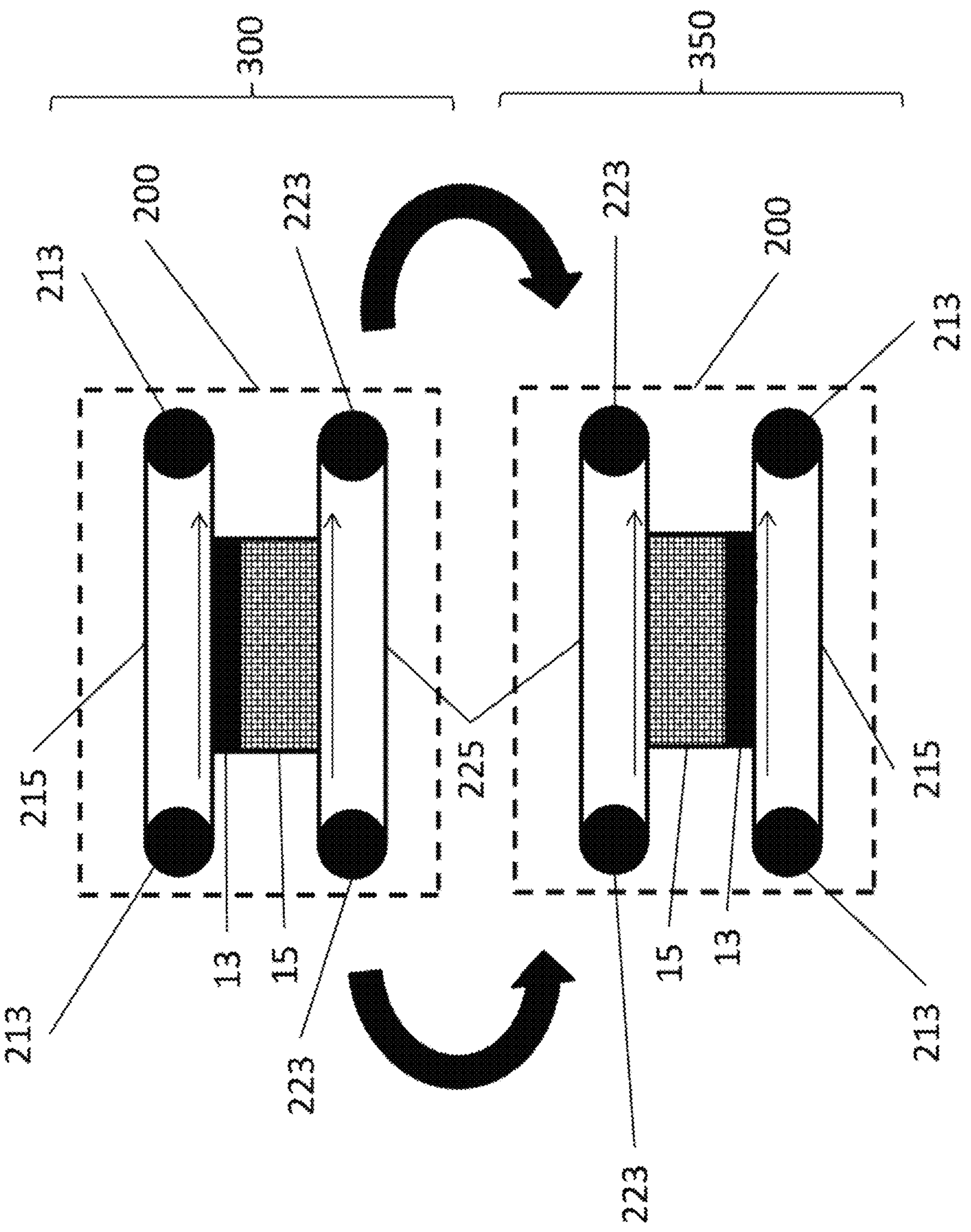
FIG. 9 illustrates a block diagram of the apparatus of FIG. 7 flipping from a first orientation to a second orientation.

FIG. 9 illustrates a block diagram of the apparatus of FIG. 7 flipping from a first orientation to a second orientation. As illustrated in FIG. 9, the flippable (rotatable) conveyor system 200 is flipped 180° from a first orientation 300 to a second orientation 350. The flippable (rotatable) conveyor system 200 may be flipped in a clockwise direction or a counter-clockwise direction.

In the first orientation 300, the first conveyor belt (conveying mechanism) 215 is located above the second conveyor belt (conveying mechanism) 225. In the second orientation 350, the first conveyor belt (conveying mechanism) 215 is located below the second conveyor belt (conveying mechanism) 225.

Moreover, in the first orientation 300, cage 15 is in an upside down orientation (in an open side down orientation). In the second orientation 350, cage 15 is in a right side up orientation (ready for receiving bedding therein).

In operations, the flipping of the conveyor belts (conveying mechanisms) (215 and 225) can be realized by a rotating shaft connected thereto. The conveyor belts (conveying mechanisms) (215 and 225) pull a row of cages 15 into the flippable (rotatable) conveyor system 200. The conveyor belts (conveying mechanisms) (215 and 225) are spring-loaded to create pressure on the cages 15 to hold the cages 15 in place while the flippable (rotatable) conveyor system 200 is being flipped.

When the row of cages 15 is in place, the flippable (rotatable) conveyor system 200 is rotated 180°, flipping the row of cages 15. The flippable (rotatable) conveyor system 200 is configured so it can continuously rotate in one direction and does not need to rotate back to its starting position to receive a new row of cages. Moreover, when a tray goes through the flippable (rotatable) conveyor system 200, the tray passes through the flippable (rotatable) conveyor system 200 uninterrupted.

Figure 10:
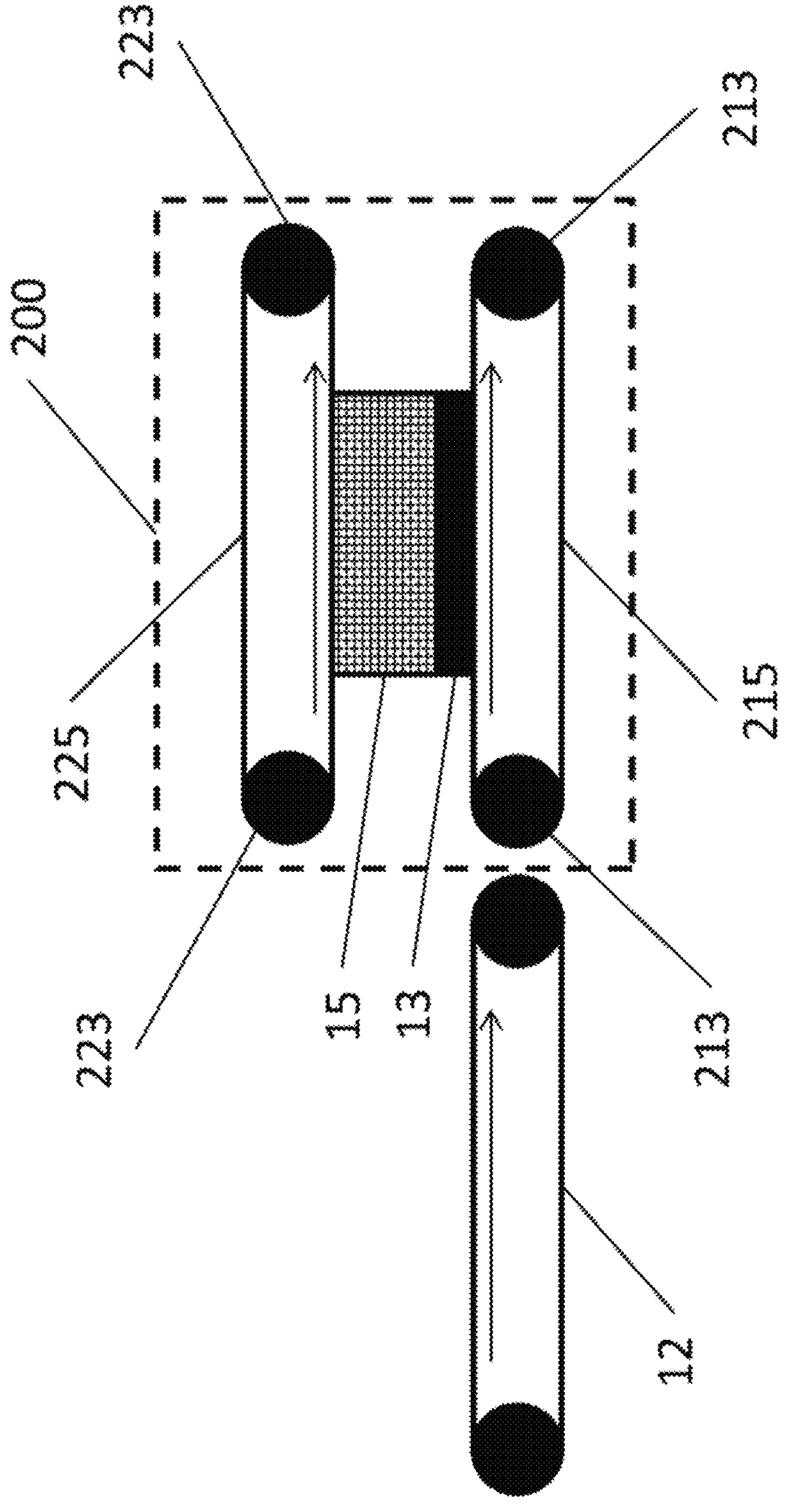
FIG. 10 illustrates a block diagram of the apparatus of FIG. 7, in a second orientation, having a cage therein.

FIG. 10 illustrates a block diagram of the apparatus of FIG. 7, in a second orientation, having a flipped cage therein. As illustrated in FIG. 10, a conveyor belt 12 is configured to move a cage 15, having a bottom 13, to flippable (rotatable) conveyor system 200. For example, conveyor belt 12 is configured to move a cage 15, having a bottom 13, from a washing station (not shown) to flippable (rotatable) conveyor system 200.

The flippable (rotatable) conveyor system 200 includes a first bi-directionality driven conveyor belt (conveying mechanism) 215, which is driven by a first set of rollers 213 and a motor (not shown), and a second bi-directionality driven conveyor belt (conveying mechanism) 225, which is driven by a second set of rollers 223 and a motor (not shown).

The first conveyor belt (conveying mechanism) 215 and the second conveyor belt (conveying mechanism) 225 work in tandem to convey the cage 15 into the flippable (rotatable) conveyor system 200.

As noted above, the first conveyor belt (conveying mechanism) 215 and the second conveyor belt (conveying mechanism) 225 are biased or spring loaded (not shown) such that the first conveyor belt (conveying mechanism) 215 and second conveyor belt 225 (conveying mechanism) both physically engage cage 15.

It is noted that the biased or spring loaded functionality may be realized by springs, air cylinders, or other mechanisms to maintain a directional bias of the second conveyor belt (conveying mechanism) 225 and the first conveyor belt (conveying mechanism) 215 towards each other.

As illustrated in FIG. 10, the first conveyor belt (conveying mechanism) 215 is located below the second conveyor belt (conveying mechanism) 225, wherein the first conveyor belt (conveying mechanism) 215 engages the bottom 13 of cage 15, and the second conveyor belt (conveying mechanism) 225 engages the top of cage 15.

The first conveyor belt (conveying mechanism) 215 and the second conveyor belt (conveying mechanism) 225 act in tandem to move cage 15, in an upright orientation, from the flippable (rotatable) conveyor system 200.

Figure 11:
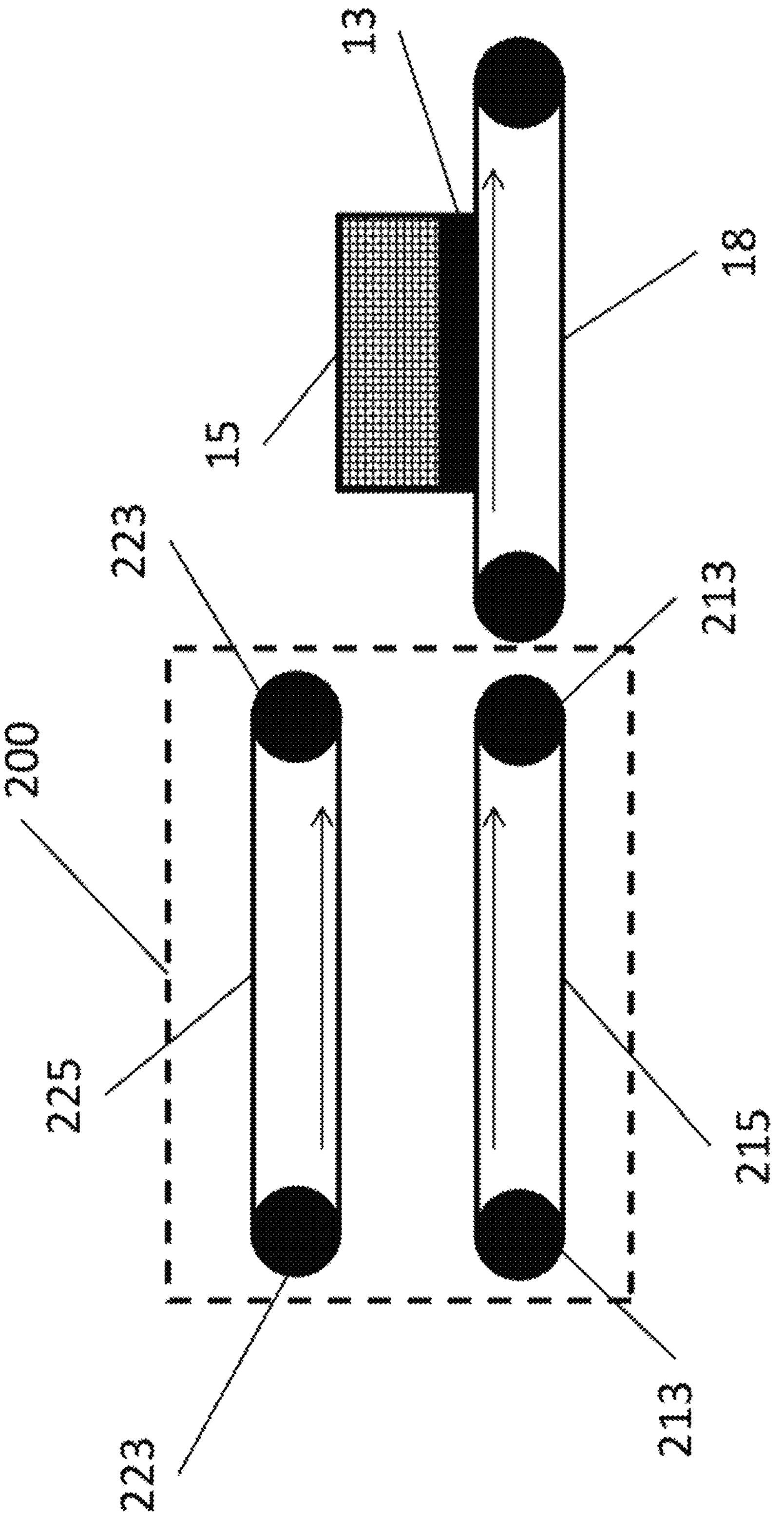
FIG. 11 illustrates a block diagram of the apparatus of FIG. 7 wherein a flipped cage has exited therefrom.

FIG. 11 illustrates a block diagram of the apparatus of FIG. 7 wherein a flipped cleaned cage has exited therefrom. As illustrated in FIG. 11, the first conveyor belt (conveying mechanism) 215 and the second conveyor belt (conveying mechanism) 225 act in tandem to move cage 15, in an upright orientation, from the flippable (rotatable) conveyor system 200 to a conveyor belt 18. For example, the first conveyor belt (conveying mechanism) 215 and the second conveyor belt (conveying mechanism) 225 act in tandem to move cage 15, in an upright orientation, from the flippable (rotatable) conveyor system 200 to a bedding filling system.

Figure 12:
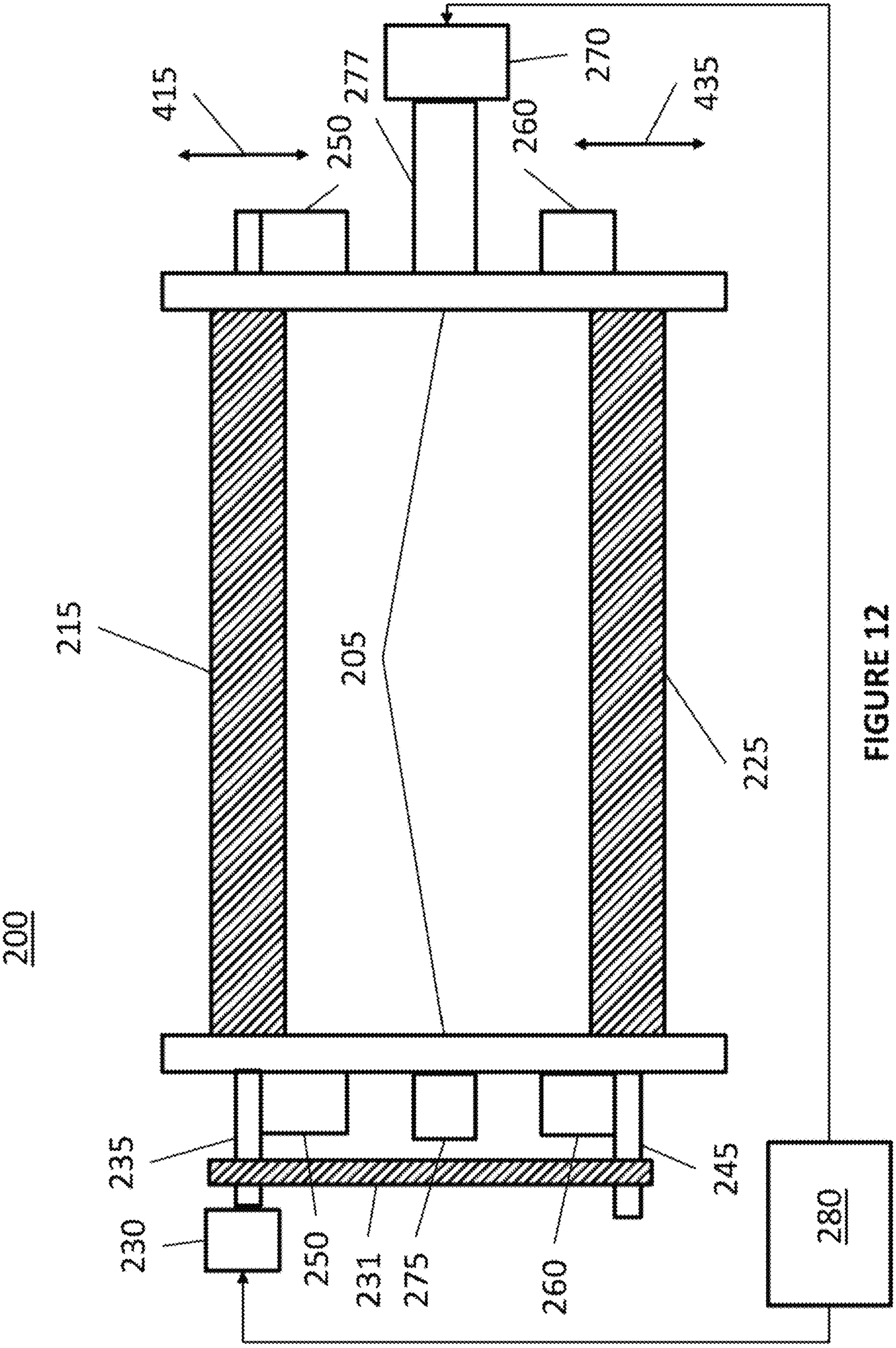
FIG. 12 is a block diagram of an apparatus for automatically flipping cages.

FIG. 12 is a block diagram of an apparatus for automatically flipping cages. As illustrated in FIG. 12, a flippable (rotatable) conveyor system 200 includes a first bi-directionality driven conveyor belt (conveying mechanism) 215, which is driven by a first drive shaft 235 and a motor 230, and a second bi-directionality driven conveyor belt (conveying mechanism) 225, which is driven by a second drive shaft 245 and a motor 230. One end of the first drive shaft 235 is mechanically linked, via linkage mechanism 231, to the second drive shaft 245 such that the rotation of drive shaft 235, through the linkage mechanism 231, causes the second drive shaft 245 to rotate. The linkage mechanism 231 may include belts or chains.

It is noted that the bi-directionality driven first conveyor belt (conveying mechanism) and the bi-directionality driven second conveyor belt (conveying mechanism) may be driven by the same motor, or alternatively, the bi-directionality driven first conveyor belt (conveying mechanism) and the bi-directionality driven second conveyor belt (conveying mechanism) may be driven by separate motors. Notwithstanding, the motor(s) is (are) controlled by a controller.

The first conveyor belt (conveying mechanism) 215 and the second conveyor belt (conveying mechanism) 225 are biased or spring loaded such that the first conveyor belt (conveying mechanism) 215 is biased or spring loaded by first biased or spring loaded mechanism 250 and second conveyor belt (conveying mechanism) 225 is biased or spring loaded by second biased or spring loaded mechanism 260. The first biased or spring loaded mechanism 250 is configured to allow the first conveyor belt (conveying mechanism) 215 a first range of motion 415. The second biased or spring loaded mechanism 260 is configured to allow the second conveyor belt (conveying mechanism) 225 a second range of motion 435.

The first biased or spring loaded mechanism 250 biases the first conveyor belt (conveying mechanism) 215 towards the second conveyor belt (conveying mechanism) 225. The second biased or spring loaded mechanism 260 biases the second conveyor belt (conveying mechanism) 225 towards the first conveyor belt (conveying mechanism) 215.

It is noted that the biased or spring loaded functionality may be realized by springs, air cylinders, or other mechanisms to maintain a directional bias of the second conveyor belt system 220 and the first conveyor belt system 210 towards each other.

The flippable (rotatable) conveyor system 200 is flipped 180° by rotating shaft 277 driven by flipping motor 270. The flippable (rotatable) conveyor system 200 may be flipped in a clockwise direction or a counter-clockwise direction.

The motor 230 and the flipping motor 270 are controlled by controller 280.

The first conveyor belt (conveying mechanism) 215 and second conveyor belt (conveying mechanism) 225 are connected together by connection members 205 such that the first conveyor belt (conveying mechanism) 215 is orientated substantially parallel to the second conveyor belt (conveying mechanism) 225.

In operations, the flipping of the conveyor belts (conveying mechanisms) (215 and 225) can be realized by rotating shaft 277 connected thereto. The conveyor belts (conveying mechanisms) (215 and 225) pull a row of cages into the flippable (rotatable) conveyor system 200. The conveyor belts (conveying mechanisms) (215 and 225) are spring-loaded to create pressure on the cages to hold the cages in place while the flippable (rotatable) conveyor system 200 is being flipped.

When the row of cages is in place, the flippable (rotatable) conveyor system 200 is rotated 180°, flipping the row of cages. The flippable (rotatable) conveyor system 200 is configured so it can continuously rotate in one direction and does not need to rotate back to its starting position to receive a new row of cages. Moreover, when a tray goes through the flippable (rotatable) conveyor system 200, the tray passes through the flippable (rotatable) conveyor system 200 uninterrupted.

Figure 13:
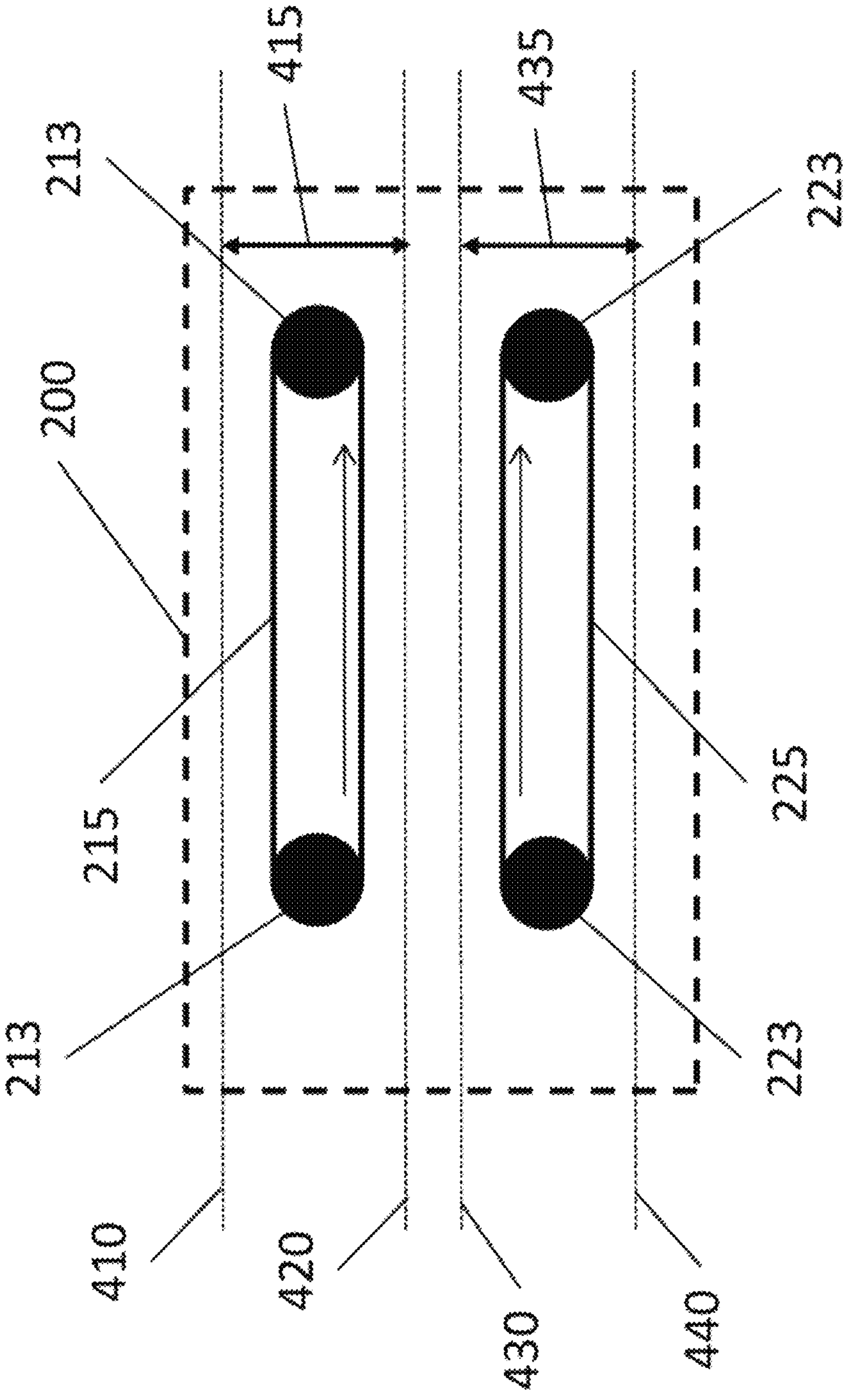
FIG. 13 is a block diagram of the apparatus of FIG. 7 showing a biased (spring loaded) functionality.

FIG. 13 is a block diagram of the apparatus of FIG. 7 showing a biased or spring loaded functionality. As illustrated in FIG. 13, flippable (rotatable) conveyor system 200 includes a first biased or spring loaded mechanism (not shown) configured to allow the first conveyor belt (conveying mechanism) 215 a first range of motion 415, and a second biased or spring loaded mechanism (not shown) configured to allow the second conveyor belt (conveying mechanism) 225 a second range of motion 435.

Moreover, the first biased or spring loaded mechanism (not shown) biases the first conveyor belt (conveying mechanism) 215 towards the second conveyor belt (conveying mechanism) 225. The second biased or spring loaded mechanism (not shown) biases the second conveyor belt (conveying mechanism) 225 towards the first conveyor belt (conveying mechanism) 215.

It is noted that the biased or spring loaded functionality may be realized by springs, air cylinders, or other mechanisms to maintain a directional bias of the second conveyor belt (conveying mechanism) 225 and the first conveyor belt (conveying mechanism) 215 towards each other.

In the various embodiments discussed above, the flippable (rotatable) conveyor system uses a biased or spring loaded mechanism to engage (grip) the top and bottom of a cage within the flippable (rotatable) conveyor system.

Moreover, in the various embodiments discussed above, the flippable (rotatable) conveyor system never has to flip back to its starting position.

Furthermore, in the various embodiments discussed above, the flippable (rotatable) conveyor system allows the system to run in manual mode, as well as allows the conveyor belts to process cages even if the flipping (motor) automation is turned OFF.

Additionally, in the various embodiments discussed above, the flippable (rotatable) conveyor system allows incomplete rows of cages to pass therethrough without jamming the system.

Lastly, in the various embodiments discussed above, the flippable (rotatable) conveyor system allows trays to pass through the system.

A cage orienting apparatus for use in an object cleaning and filling system includes: a first conveyor device; a second conveyor device; and a rotating mechanism, operatively connected to the first conveyor device and the second conveyor device, configured to rotate the first conveyor device and the second conveyor device 180°; the first conveyor device and the second conveyor device being positioned such that the first conveyor device and the second conveyor device are substantially parallel.

The cage orienting apparatus may include a biased mechanism configured to bias the first conveyor device towards the second conveyor device and to provide a range of movement for the first conveyor device.

The first biased mechanism may be configured to cause the conveyor device and the second conveyor device to securely engage a cage located therebetween.

The cage orienting apparatus may include a biased mechanism configured to bias the second conveyor device towards the first conveyor device and to provide a range of movement for the second conveyor device.

The biased mechanism may be configured to cause the first conveyor device and the second conveyor device to securely engage a cage located therebetween.

The rotating mechanism may be configured to rotate the first conveyor device and the second conveyor device 180° in a clockwise direction.

The rotating mechanism may be configured to rotate the first conveyor device and the second conveyor device 180° in a counter-clockwise direction.

The first conveyor device and the second conveyor device may include conveyor belts.

The first conveyor device and the second conveyor device may include rollers.

The biased mechanism may include a spring.

The biased mechanism may include an air cylinder.

An animal cage cleaning and filling system includes a washing device having a first conveyor which transports an animal cage through a washing station in an open side down orientation; a bedding dispenser having a second conveyor for transporting the animal cage through a filling station in an open side up orientation to dispense bedding material therein; and a cage orienting apparatus located between the first conveyor and the second conveyor; the cage orienting apparatus including a first conveyor device, a second conveyor device, and a rotating mechanism, operatively connected to the first conveyor device and the second conveyor device, configured to rotate the first conveyor device and the second conveyor device 180°; the first conveyor device and the second conveyor device being positioned such that the first conveyor device and the second conveyor device are substantially parallel.

The animal cage cleaning and filling system may include a first biased mechanism configured to bias the first conveyor device towards the second conveyor device and to provide a range of movement for the first conveyor device.

The first biased mechanism may be configured to cause the first conveyor device and the second conveyor device to securely engage a cage located therebetween.

The animal cage cleaning and filling system may include a second biased mechanism configured to bias the second conveyor device towards the first conveyor device and to provide a range of movement for the second conveyor device.

The second biased mechanism may be configured to cause the first conveyor device and the second conveyor device to securely engage a cage located therebetween.

The rotating mechanism may be configured to rotate the first conveyor device and the second conveyor device 180° in a clockwise direction.

The rotating mechanism may be configured to rotate the first conveyor device and the second conveyor device 180° in a counter-clockwise direction.

The first conveyor device and the second conveyor device may include conveyor belts.

The first conveyor device and the second conveyor device may include rollers.

The biased mechanism may include a spring.

The biased mechanism may include an air cylinder.

A method of orienting a cage for use in an object cleaning and filling system, includes (a) receiving a cage in an open side down orientation from an object cleaning system; (b) engaging the received cage using a conveyor system, the conveyor system having two operatively connected parallel conveying systems; (c) rotating the conveyor system, with the received cage engaged therebetween, 180° such that the received cage engaged therebetween is in an open side up orientation; and (d) conveying, using the conveyor system, the received cage, in the open side up orientation, to a filling system.

The method may include (e) receiving a tray from the object cleaning system; (f) conveying, using the conveyor system, the received cage out of the conveyor system without rotating the conveyor belt system 180°.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A cage orienting apparatus for use in an object cleaning and filling system comprising:

a first conveyor device;

a second conveyor device; and a rotating mechanism, operatively connected to said first conveyor device and said second conveyor device, configured to rotate said first conveyor device and said second conveyor device 180°;

said first conveyor device and said second conveyor device being positioned such that said first conveyor device and said second conveyor device are substantially parallel.

2. The cage orienting apparatus, as claimed in claim 1, further comprising a biased mechanism configured to bias said first conveyor device towards said second conveyor device and to provide a range of movement for said first conveyor device.

3. The cage orienting apparatus, as claimed in claim 1, further comprising a biased mechanism configured to bias said second conveyor device towards said first conveyor device and to provide a range of movement for said second conveyor device.

4. The cage orienting apparatus, as claimed in claim 2, further comprising an additional biased mechanism configured to bias said second conveyor device towards said first conveyor device and to provide a range of movement for said second conveyor device.

5. The cage orienting apparatus, as claimed in claim 1, wherein said rotating mechanism is configured to rotate said first conveyor device and said second conveyor device 180° in a clockwise direction.

6. The cage orienting apparatus, as claimed in claim 1, wherein said rotating mechanism is configured to rotate said first conveyor device and said second conveyor device 180° in a counter-clockwise direction.

7. The cage orienting apparatus, as claimed in claim 1, wherein said first conveyor device and said second conveyor device include conveyor belts.

8. The cage orienting apparatus, as claimed in claim 1, wherein said first conveyor device and said second conveyor device include rollers.

9. The cage orienting apparatus, as claimed in claim 2, wherein said biased mechanism includes a spring.

10. The cage orienting apparatus, as claimed in claim 2, wherein said biased mechanism includes an air cylinder.

11. An animal cage cleaning and filling system comprising:

a washing device having a first conveyor which transports an animal cage through a washing station in an open side down orientation;

a bedding dispenser having a second conveyor for transporting said animal cage through a filling station in an open side up orientation to dispense bedding material therein; and a cage orienting apparatus located between said first conveyor and said second conveyor;

said cage orienting apparatus including a first conveyor device, a second conveyor device, and a rotating mechanism, operatively connected to said first conveyor device and said second conveyor device, configured to rotate said first conveyor device and said second conveyor device 180°;

said first conveyor device and said second conveyor device being positioned such that said first conveyor device and said second conveyor device are substantially parallel.

12. The animal cage cleaning and filling system, as claimed in claim 11, further comprising a biased mechanism configured to bias said first conveyor device towards said second conveyor device and to provide a range of movement for said first conveyor device.

13. The animal cage cleaning and filling system, as claimed in claim 11, further comprising a biased mechanism configured to bias said second conveyor device towards said first conveyor device and to provide a range of movement for said second conveyor device.

14. The animal cage cleaning and filling system, as claimed in claim 12, further comprising an additional biased mechanism configured to bias said second conveyor device towards said first conveyor device and to provide a range of movement for said second conveyor device.

15. The animal cage cleaning and filling system, as claimed in claim 11, wherein said rotating mechanism is configured to rotate said first conveyor device and said second conveyor device 180° in a clockwise direction.

16. The animal cage cleaning and filling system, as claimed in claim 11, wherein said rotating mechanism is configured to rotate said first conveyor device and said second conveyor device 180° in a counter-clockwise direction.

17. The animal cage cleaning and filling system, as claimed in claim 11, wherein said first conveyor device and said second conveyor device include conveyor belts.

18. The animal cage cleaning and filling system, as claimed in claim 11, wherein said first conveyor device and said second conveyor device include rollers.

19. The animal cage cleaning and filling system, as claimed in claim 12, wherein said biased mechanism includes a spring.

20. The animal cage cleaning and filling system, as claimed in claim 12, wherein said biased mechanism includes an air cylinder.

21. A method of orienting a cage for use in an object cleaning and filling system, comprising:

(a) receiving a cage in an open side down orientation from an object cleaning system;

(b) engaging the received cage using a conveyor system, the conveyor system having two operatively connected parallel conveying devices;

(c) rotating the conveyor system, with the received cage engaged therebetween, 180° such that the received cage engaged therebetween is in an open side up orientation; and (d) conveying, using the conveyor system, the received cage, in the open side up orientation, to a filling system.

22. The method, as claimed in claim 21, further comprising:

(e) receiving a tray from the object cleaning system;

(f) conveying, using the conveyor system, the received cage out of the conveyor belt system without rotating the conveyor system 180°.

* * * * *